(12) United States Patent
Belitz

(10) Patent No.: US 10,823,370 B2
(45) Date of Patent: Nov. 3, 2020

(54) LIGHT BEACON LENS

(71) Applicant: Federal Signal Corporation, Oak Brook, IL (US)

(72) Inventor: Duane P. Belitz, Frankfort, IL (US)

(73) Assignee: Federal Signal Corporation, Oak Brook, IL (US)

(*) Notice: Subject to any disclaimer, the term of this patent is extended or adjusted under 35 U.S.C. 154(b) by 0 days.

(21) Appl. No.: 16/576,231

(22) Filed: Sep. 19, 2019

(65) Prior Publication Data

US 2020/0096172 A1 Mar. 26, 2020

Related U.S. Application Data

(60) Provisional application No. 62/734,024, filed on Sep. 20, 2018.

(51) Int. Cl.
| | |
|---|---|
| *F21V 5/00* | (2018.01) |
| *F21V 5/04* | (2006.01) |
| *F21S 8/00* | (2006.01) |
| *F21S 10/06* | (2006.01) |
| *F21V 15/01* | (2006.01) |
| *F21W 111/00* | (2006.01) |
| *F21Y 115/10* | (2016.01) |

(52) U.S. Cl.
CPC ............... *F21V 5/045* (2013.01); *F21S 8/03* (2013.01); *F21S 10/06* (2013.01); *F21V 5/046* (2013.01); *F21V 15/01* (2013.01); *F21W 2111/00* (2013.01); *F21Y 2115/10* (2016.08)

(58) Field of Classification Search
CPC .......... F21V 5/045; F21V 5/046; F21V 15/01; F21V 5/008; F21V 5/02; F21S 8/03; F21S 10/06; F21W 2111/00; F21W 2111/043; F21Y 2115/10

See application file for complete search history.

(56) References Cited

U.S. PATENT DOCUMENTS 1,732,745 A * 10/1929 Erskine ................... F21V 5/045
362/227
1,986,065 A 1/1935 Andre
(Continued)

FOREIGN PATENT DOCUMENTS

| CN | 1553075 A | 12/2004 |
|---|---|---|
| CN | 107178764 A | 9/2017 |
| KR | 930004812 B1 | 6/1993 |

OTHER PUBLICATIONS https://www.warninglightsinc.com/products/22335, SWS Warning Lights Inc., Amber & Blue Medium Profile Fleet + Beacon Permanent Mount, 2018, 3 pages.
(Continued)

*Primary Examiner* — Y M. Quach Lee
(74) *Attorney, Agent, or Firm* — Merchant & Gould P.C.

(57) ABSTRACT

Light beacons and light beacon systems including a lens or housing configured to collimate light emitted from two discrete optical focal points positioned along a central longitudinal axis of the beacon. The example lens can be, e.g., cylindrical or frusto-conical, and an outer surface of the lens defines at least a first region that is optically tuned to a first of the optical focal points, a second region that is optically tuned to a second of the optical focal points, and a third region that is optically tuned to both focal points.

20 Claims, 13 Drawing Sheets

SECTION A-A

(56) References Cited

U.S. PATENT DOCUMENTS

| | | | |
|---|---|---|---|
| 3,875,561 A | | 4/1975 | Scarpino |
| 5,178,636 A | | 1/1993 | Silberman |
| 5,224,773 A | * | 7/1993 | Arimura .................. F21V 5/00 |
| | | | 362/332 |
| 5,504,544 A | | 4/1996 | Dreyer |
| 5,664,863 A | | 9/1997 | Cassarly |
| 6,481,873 B1 | | 11/2002 | Smith |
| 6,678,097 B2 | | 1/2004 | McKenney |
| 7,534,009 B2 | | 5/2009 | Trojanowski |
| 8,215,802 B2 | | 7/2012 | Bailey |
| 8,360,615 B2 | | 1/2013 | Rizkin |
| 8,628,219 B2 | | 1/2014 | Peck |
| 8,662,702 B2 | | 3/2014 | Datz |
| 8,998,443 B1 | | 4/2015 | Shumate |
| 9,097,841 B2 | | 8/2015 | Fornari |
| 2006/0250801 A1 | | 11/2006 | Trenchard |
| 2011/0058370 A1 | | 3/2011 | Datz |
| 2012/0060920 A1 | | 3/2012 | Fornari |
| 2012/0182730 A1 | | 7/2012 | Datz |

OTHER PUBLICATIONS https://www.railheadcorp.com/product/m100r-led/, Railhead Corporation, M100R-LED Mid-Size Flash Red Safety Light, Jun. 7, 2018 (1 page).

* cited by examiner

SECTION A-A

SECTION B-B

SECTION D-D

SECTION C-C

LIGHT BEACON LENS

BACKGROUND

Light beacons are generally used in a flashing or continuous manner and are typically placed on or in large vehicles or buildings to notify others of the size and/or presence of such objects.

SUMMARY

Embodiments of the present disclosure are directed to a light beacon and light beacon systems. In one aspect, a light beacon includes a housing adapted to transmit light, the housing having a curved, radially enclosed inner surface defined by a central longitudinal axis extending from a bottom to a top of the housing, and an outer surface, the outer surface defining at least first, second, and third optical collimating regions, the third collimating region being above the first collimating region and below the second collimating region, the first collimating region including at least one lens element optically tuned to a first optical focal point of the housing, the second collimating region including at least one lens element optically tuned to a second optical focal point of the housing, and the third collimating region including at least one lens element optically tuned to both the first and the second optical focal points of the housing, the first and second optical focal points being located along the central longitudinal axis and spaced apart from each other. In some examples, the first focal point is located below the second focal point along the central longitudinal axis.

In some examples, the outer surface of the housing defines Fresnel lens elements in at least a portion of the first collimating region and at least a portion of the second collimating region.

In some examples, the housing includes a ring-shaped notch extending at least partially radially inwards towards the central longitudinal axis and positioned between the third collimating region and either the first or the second collimating region.

In some examples, the housing includes a first ring-shaped notch extending at least partially radially inwards towards the central longitudinal axis and positioned between the third collimating region and the first collimating region, and a second ring-shaped notch extending at least partially radially inwards towards the central longitudinal axis and positioned between the third collimating region and the second collimating region.

In some examples, the inner surface is a cylindrical surface.

In some examples, the inner surface is a frusto-conical surface.

In some examples, the housing has a closed top.

In some examples, the housing has an open bottom.

In some examples, the housing is mounted to a base.

In some examples, the beacon system includes a vehicle, the base being mountable to an exterior surface of the vehicle.

In some examples, the beacon system includes a building, e.g., a light house, the beacon being placed in a lantern room of the building.

In some examples, a light emitter is positioned within the housing at the same height as at least one of the first optical focal point and the second optical focal point.

In some examples, a light emitter is positioned within the housing at the same height as each of the first and second optical focal points.

In some examples, the light emitters are positioned at the first and second optical focal points.

In some examples, the light emitters are adapted to emit light towards the inner surface of the housing.

In some examples, the light beacon or light beacon system includes wiring for powering and controlling the light emitters.

In some examples, the light beacon or light beacon system includes a controller for controlling a light emission pattern from the light emitters.

In some examples, the light beacon or light beacon system includes one or more processors and a memory storing computer-readable instructions that are executable by the one or more processors to generate signals for controlling the light emitters.

In some examples, the outer surface of the housing is configured such that the first collimating region includes a first upper section and a first lower section, the first upper section including an outwardly convex first central lens element, an outwardly convex first upper lens element positioned above the first central lens element, and an outwardly convex first lower lens element positioned below the first central element, and the second collimating region includes a second upper section and a second lower section, the second lower section including an outwardly convex second central lens element, an outwardly convex second upper lens element positioned above the first central lens element, and an outwardly convex second lower lens element positioned below the first central element, wherein the lens elements of the first upper section are tuned to the first optical focal point, and wherein the lens elements of the second upper section are tuned to the second optical focal point.

In some examples, the outer surface of the housing is configured such that the first lower section includes a plurality of lower lens elements that are tuned to the first focal point, and the second upper section includes a plurality of upper lens elements that are tuned to the second focal point.

In some examples, the third collimating region includes a plurality of third lens elements, each of the third lens elements including a first outward face tuned to the first optical focal point and a second outward face tuned to the second optical focal point.

In some examples, the third lens elements include a middle lens element that protrudes outwardly more than the others of the third lens elements.

In some examples, each of the third lens elements defines a ridge line at a transition between the first and second outward faces, wherein the ridge lines of the third lens elements define a reference curve that is outwardly convex.

In some examples, a total number of the third lens elements equals a total number of each of a total number of the upper lens elements and a total number of a lower lens elements.

In some examples, a longitudinal length of the first lower section equals a longitudinal length of the second upper section.

In some examples, a longitudinal length of the first lower section equals a longitudinal length of the second upper section and a longitudinal length of the third region.

In some examples, a longitudinal length of the first upper section equals a longitudinal length of the second lower section.

In some examples, all of the lens elements of the first, second, and third collimating regions define complete rings in planes perpendicular to the longitudinal axis.

In some examples, a central lens axis of the first central lens element extends through the first focal point, and a central lens axis of the second central lens element extends through the second focal point.

In some examples, a longitudinal center of the third region is at the same height as a longitudinal midpoint between the first and second optical focal points.

In some examples, the inner surface of the housing includes a plurality of light spreaders.

In some examples the plurality of light spreaders comprise at least substantially longitudinally extending undulations of the inner surface, the undulations including alternating radial peaks and radial valleys.

In some examples, the peaks define a reference cylindrical surface.

In some examples, the peaks define a reference frusto-conical surface.

In some examples, the undulations are regularly radially spaced apart from one another and entirely surround the central longitudinal axis of the beacon.

As used herein, a lens element is "tuned" or "optically tuned" to a focal point if a light beam emitted from a light source positioned at the focal point is deflected by the lens element such that the deflected beam propagates from the lens element at an angle that is at least substantially perpendicular to the central longitudinal axis of the housing. In some examples, "at least substantially perpendicular" means any angle relative to the central axis of the housing that is in a range from about 87° to about 93°, or in a range from about 88° to about 92°, or in a range from about 89° to about 91°, or in a range from about 89.5° to about 90.5°, or in a range from about 89.8° to about 90.2°, or in a range from about 89.9° to about 90.1°.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure as claimed.

DESCRIPTION OF THE DRAWINGS

The following figures, which form a part of this application, are illustrative of described technology and are not meant to limit the scope of the disclosure as claimed in any manner, which scope shall be based on the claims appended hereto.

DETAILED DESCRIPTION

Figure 1:
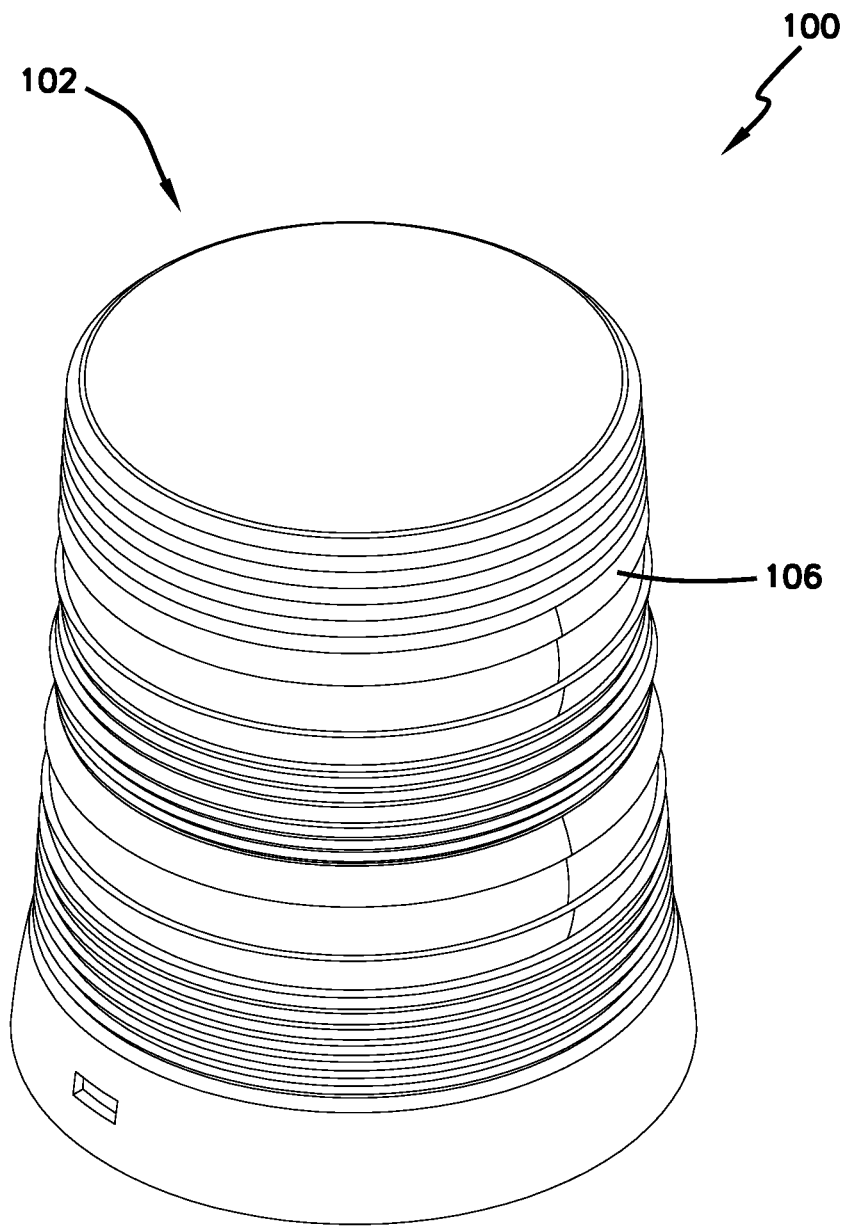
FIG. 1 is a perspective view of an example light beacon in accordance with the present disclosure.
Figure 2:
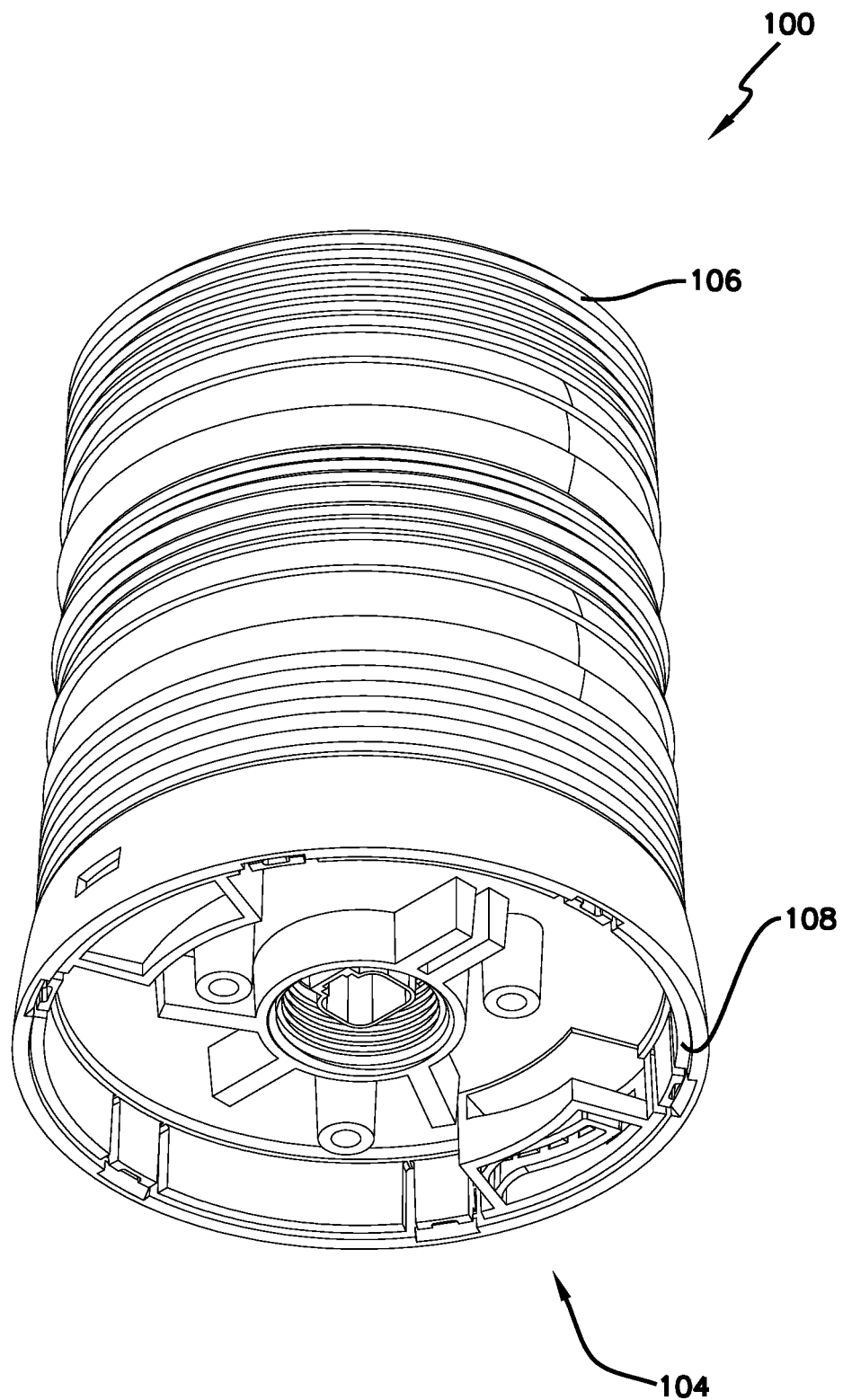
FIG. 2 is a further perspective view of the light beacon of FIG. 1.
Figure 3:
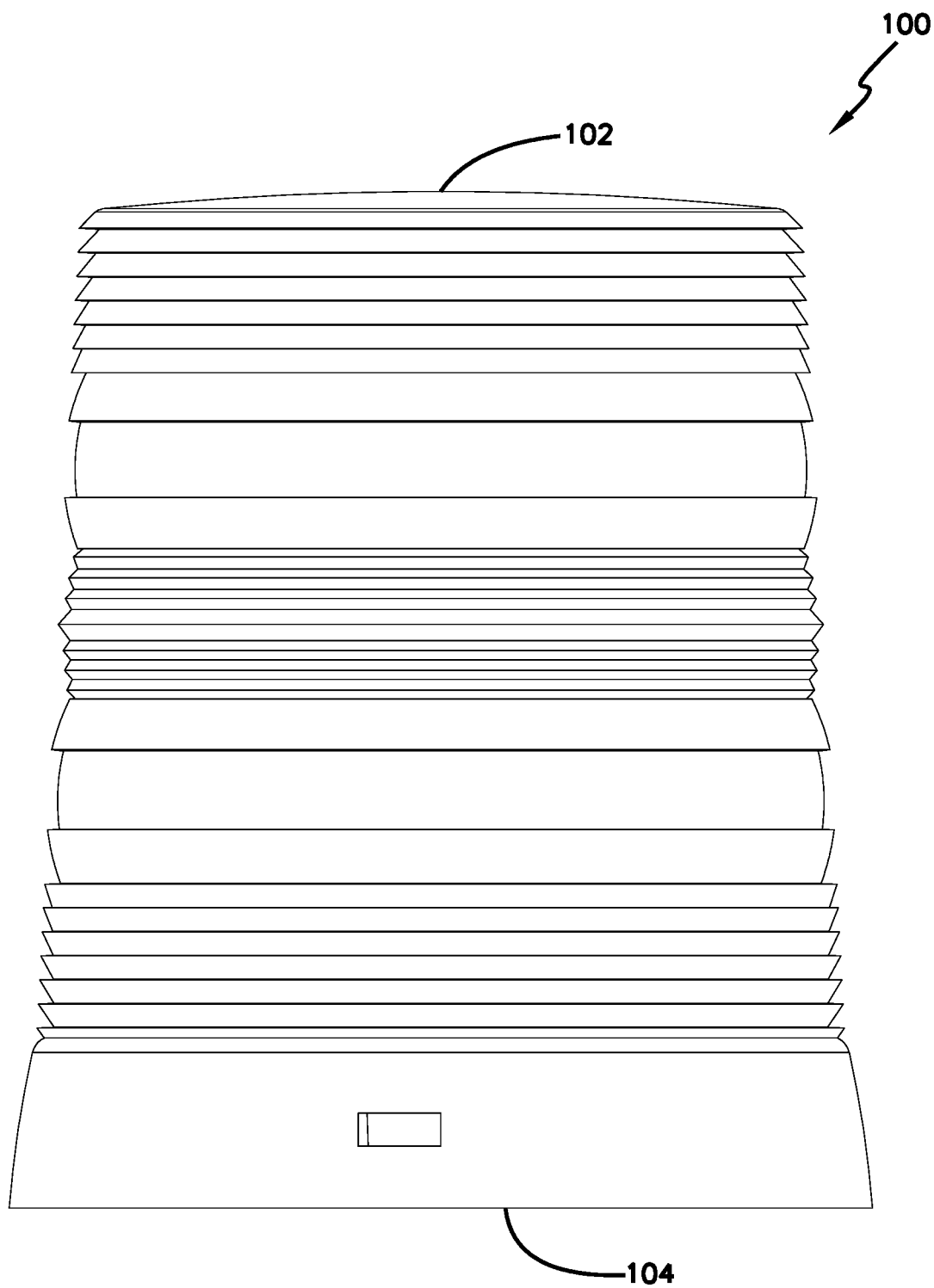
FIG. 3 is a side view of the light beacon of FIG. 1.
Figure 4:
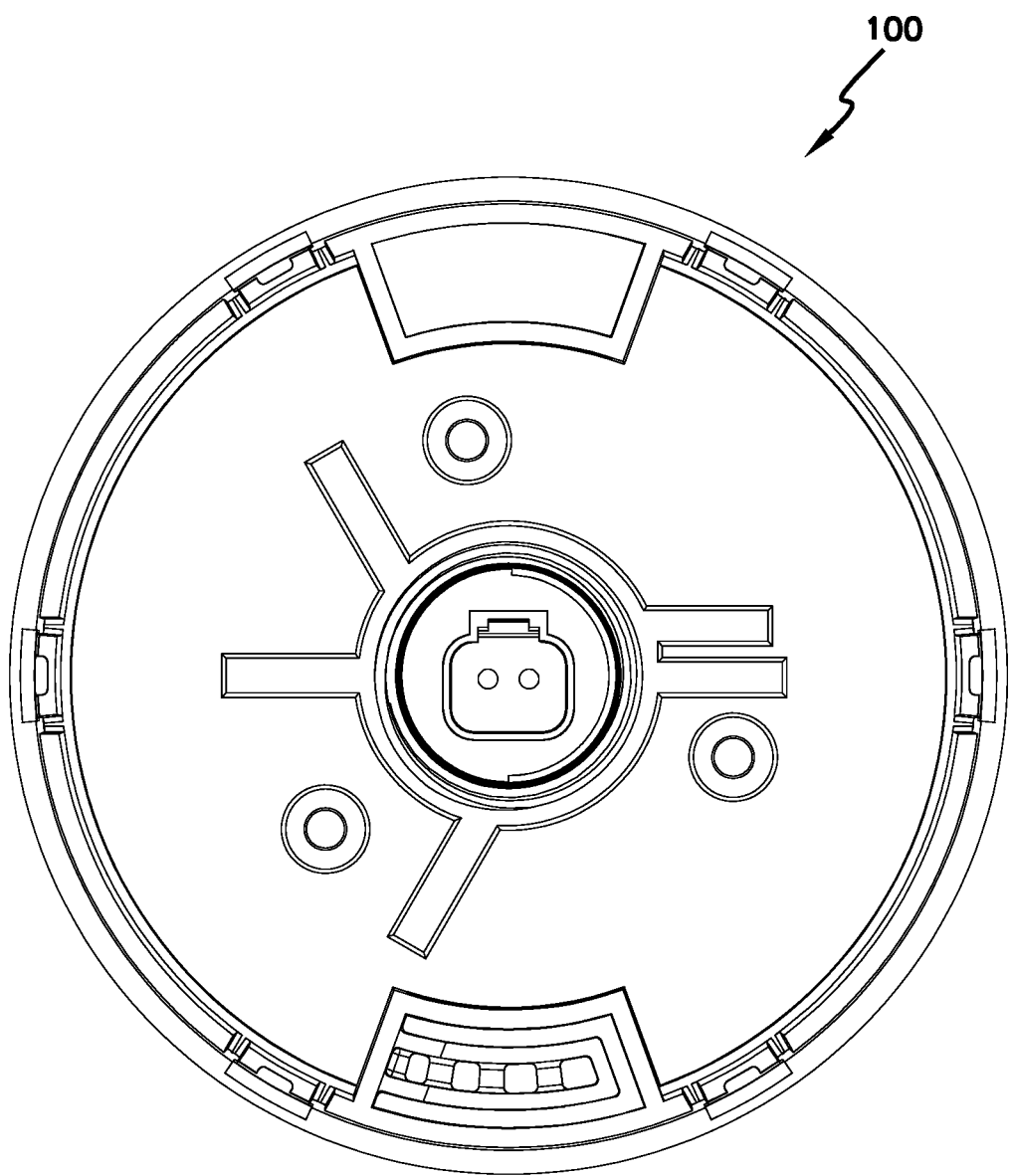
FIG. 4 is a bottom view of the light beacon of FIG. 1.
Figure 5:
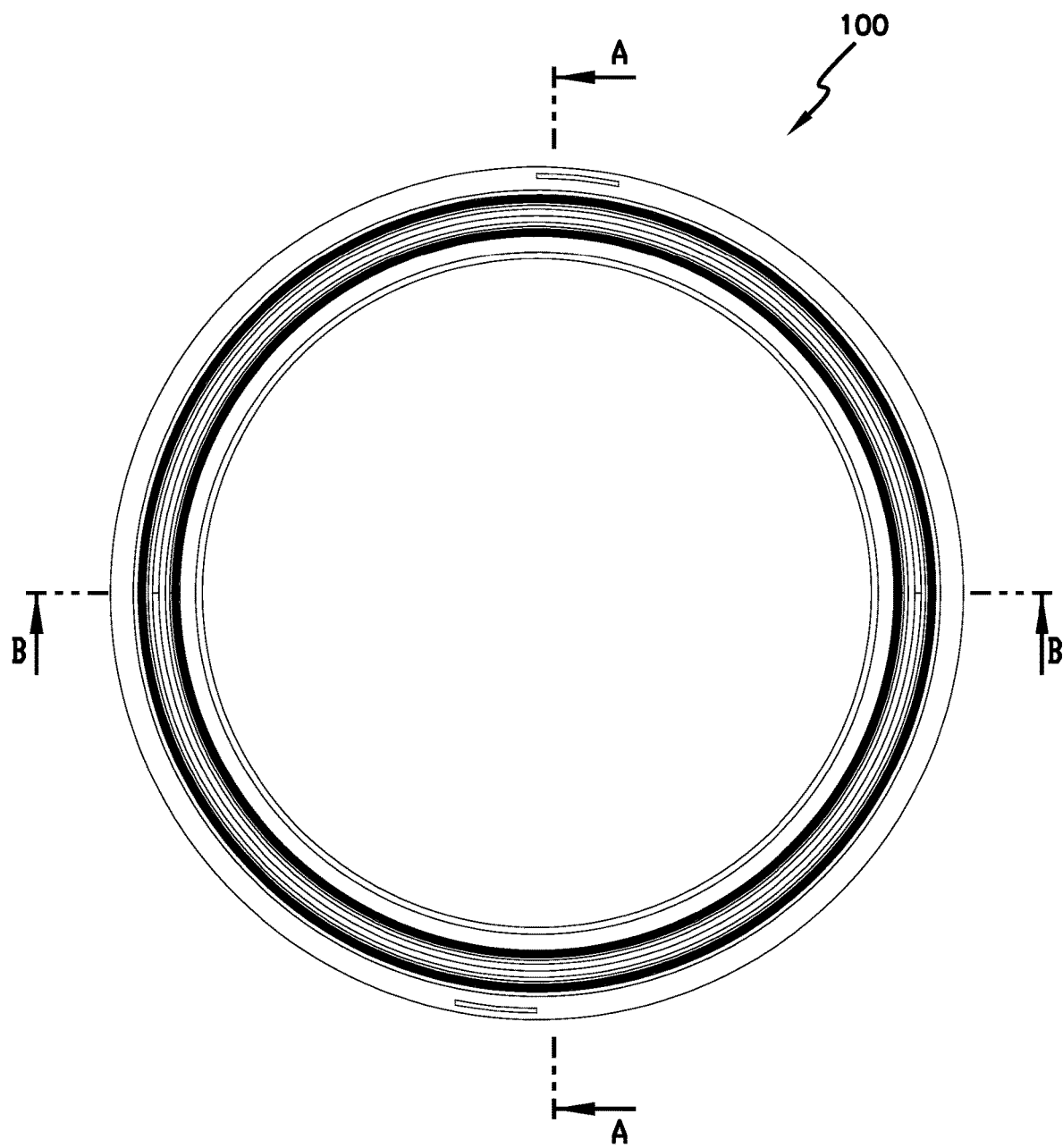
FIG. 5 is a top view of the light beacon of FIG. 1.

Various embodiments of the present inventions will be described in detail with reference to the drawings, wherein like reference numerals represent like parts and assemblies throughout the several views. Reference to various embodiments does not limit the scope of the inventions, which are limited only by the scope of the claims attached hereto. Additionally, any examples set forth in this specification are not intended to be limiting and merely set forth some of the many possible embodiments for the claimed inventions.

Light beacons typically include a transparent housing (e.g., a cylindrical or frusto-conical dome) mounted to a base. The housing houses one or more light sources connected to a power source and electronics that control flash pattern, light intensity, light color, etc. In some light beacons, the housing is equipped with a Fresnel lens structure that complements the shape of the housing. For example, a cylindrical housing includes a cylindrical Fresnel lens. Generally, these lenses include a large number of light propagation surfaces along the rounded exterior side surface of the housing, each aligned at different angles to refract light outwardly through the lens from a generally central, singular, light source location at the singular focal point of the lens.

The Fresnel lens acts as a collimator, deflecting oblique incident light beams from the centralized light source such that they leave the lens travelling perpendicularly to the beacon's cylindrical axis and along or parallel to an optical line of sight. In particular, each exterior light emitting surface of the Fresnel lens is "tuned," i.e., shaped and angled, specifically to the singular focal point of the lens. This tuning maximizes the amount of light coming from the focal point that the lens collimates to the line of sight. Incident light beams that are perpendicular to the beacon's cylindrical axis pass through the curved surface of the central region of the Fresnel lens without being deflected. The overall effect is to increase the amount of light from the light source propagating along the line of sight and that therefore will be visible to an average observer of the beacon.

Having only a single light source (e.g., a single light emitting diode, or LED) significantly limits how much light is generated by the beacon. Simply adding light sources to the beacon has drawbacks because the extra light sources would necessarily be positioned away from the focal point, which significantly limits the proportion of light produced by the extra sources that can be collimated by the Fresnel lens to the line of sight. That is, as light sources are added to a single focal point beacon, their contribution to the overall performance of the beacon is reduced.

In addition, while stacking one Fresnel lens atop another along the cylindrical axis of the beacon can increase the number of focal points, it also increases the number of bright spots, since the light intensity propagating from the beacon will decrease in the region between the focal points, reaching a minimum at the midpoint between the focal points, and maxima at the focal points. Having more than one bright spot can provide an undesirable lit appearance of the beacon. In addition, adding one Fresnel lens atop another can negatively impact the height and/or the aspect ratio (of height to diameter) of the beacon from an aesthetic and/or logistical perspective, depending on how the beacon is to be used and where it is to be located.

Referring to FIGS. 1-7, an example light beacon 100 in accordance with the present disclosure has a top 102, a bottom 104, a housing or lens 106 (which can be transparent, semi-transparent and/or colored), and a base 108 to which the housing 106 is secured. The housing 106 defines an interior volume 112 and is defined by a central longitudinal axis A1. The housing 106 is substantially radially symmetrical about the central longitudinal axis A1.

The housing 106 includes a side wall 114 that radially surrounds the central axis and a top wall 116. The top wall 116 thus covers and closes the top 102 of the beacon 100.

A stand 110 is mounted to the base 108 and extends upwards into the interior volume 112. The stand 110 supports a plurality of light emitters 120. In this example, the light emitters 120 are included in two sets 122 and 124 of light emitters 120.

At least a portion of the first set 122 of light emitters 120 is at least substantially laterally aligned with a first optical focal point FP1 of the beacon 100. That is, at least a portion of the first set 122 falls on a first lateral axis A2, where the first optical focal point FP1 is at the intersection of the first lateral axis A2 and the central longitudinal axis A1. In addition, at least a portion of the second set 124 of light emitters 120 is at least substantially laterally aligned with a second optical focal point FP2 of the beacon 100. That is, at least a portion of the second set 124 falls on a second lateral axis A3, where the second optical focal point FP2 is at the intersection of the second lateral axis A3 and the longitudinal axis A1.

Figure 8:
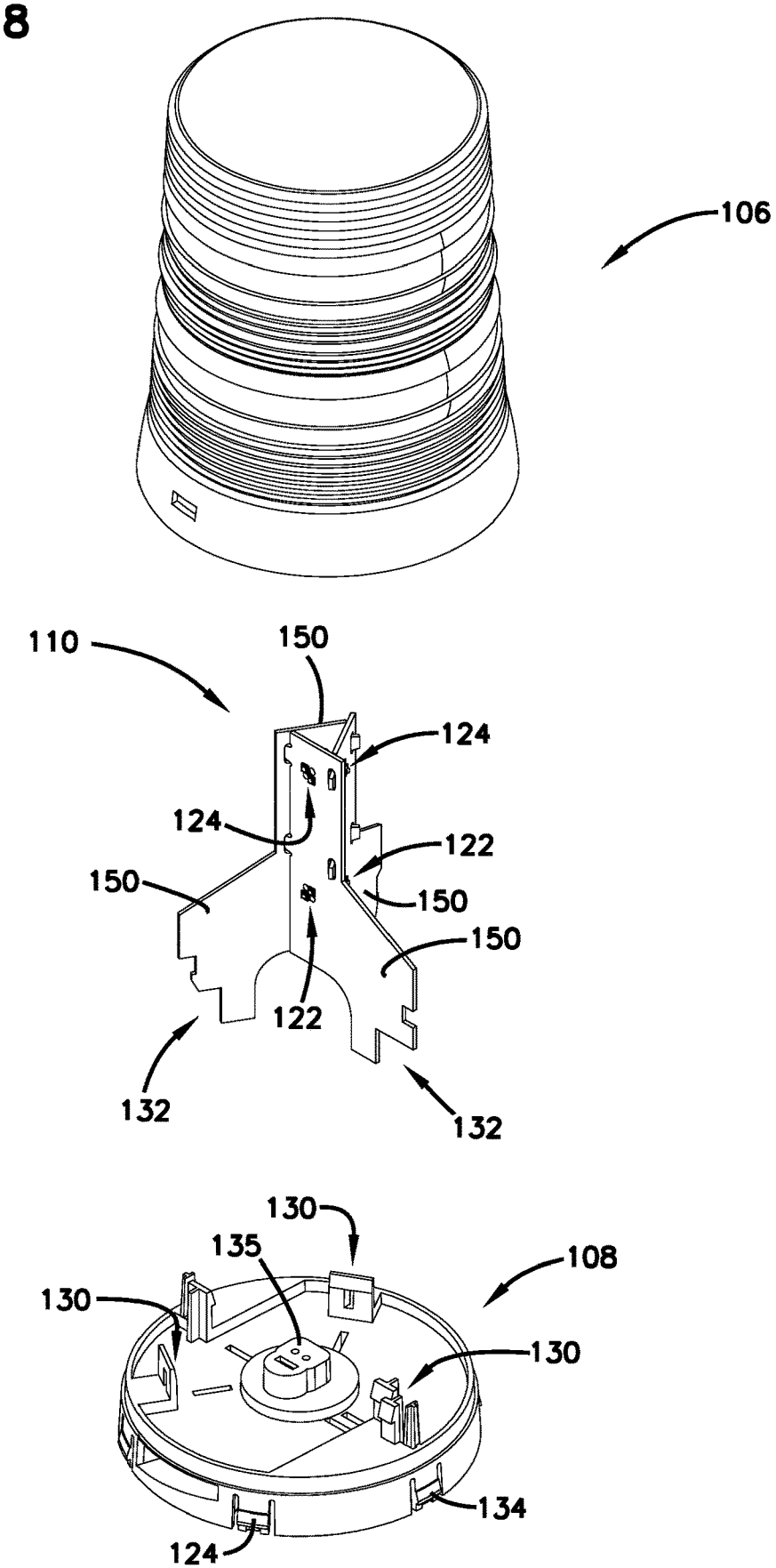
FIG. 8 is a partially exploded view of the light beacon of FIG. 1.

In the particular example beacon 100, the positioning of the light emitters 120 on the stand 110 provides for relatively high intensity light emission in all radial directions (360°) about the axis A1 from each optical focal point, FP1, FP2. In particular, in this example, each set 122, 124, of light emitters, includes at least one light emitter 120 on each of three legs 150 (FIG. 8) of the stand 110, where the legs 150 are coupled to one another at approximately 60° angles, providing a discrete radial light emission spread for each leg at each focal point of approximately 120°.

The light emitters 120 can be any suitable light emitters, e.g., fluorescent light emitters, incandescent light emitters, liquid crystal light emitters, organic light emitting diodes etc. In some example, the light emitters 120 are high output light emitting diodes (LED), such as a Cree® XLamp® XM-L LED (Cree, Inc. UL®, Durham, N.C.). The light emitters 120 can be configured to emit white light or non-white light (e.g., blue, red, orange, yellow, etc.). Optionally, the light emitters 120 emit a white light that is filtered by the housing 106 such that the light that propagates from the beacon 100 is non-white (e.g., blue, red, orange, yellow, etc.).

As noted, in this example, the beacon 100 includes two optical foci FP1 and FP2, both positioned along the central longitudinal axis A1 of the beacon. In alternative embodiments, the beacon can include three, four, five, or more optical foci aligned along the central longitudinal axis, and/or two or more optical foci wherein one or more of the foci is/are offset from the central longitudinal axis, without departing from at least some of optical properties of the beacons of the present disclosure as described in further detail below. One or more light emitters can be positioned at or near each of the foci.

The base 108 includes coupling features 130 (e.g., latches or tabs) for securely coupling the stand 110 to the base 108. Thus, for example, the coupling features 130 can be adapted to engage complementarily configured coupling features 132 (e.g., slots, grooves, shoulders) of the stand 110. The base 108 also includes flexibly resilient latch arms 134 positioned about an outer perimeter of the base 108. The flexibly resilient latch arms 134 are adapted to latch to complementary coupling features of the housing 106 to provide a secure, but reversible coupling of the base 108 to the housing 106. A connector 135 of the base 108 provides power and/or control connectivity between a power source and/or a controller, and the light emitters 120, with conductors (e.g., wires, traces on a printed circuit board (PCB), etc.) providing electrical connectivity between the plug 135 and the light emitters 120.

Figure 9:
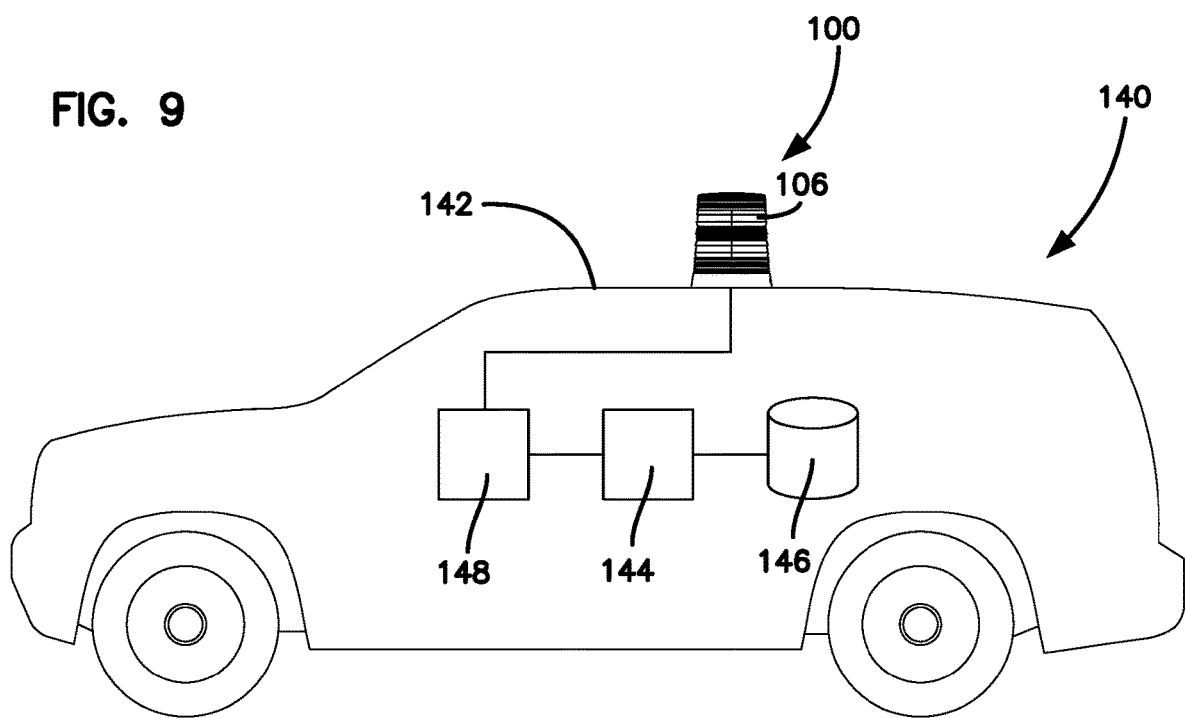
FIG. 9 is schematic depiction of the light beacon of FIG. 1 mounted to a vehicle.
Figure 10:
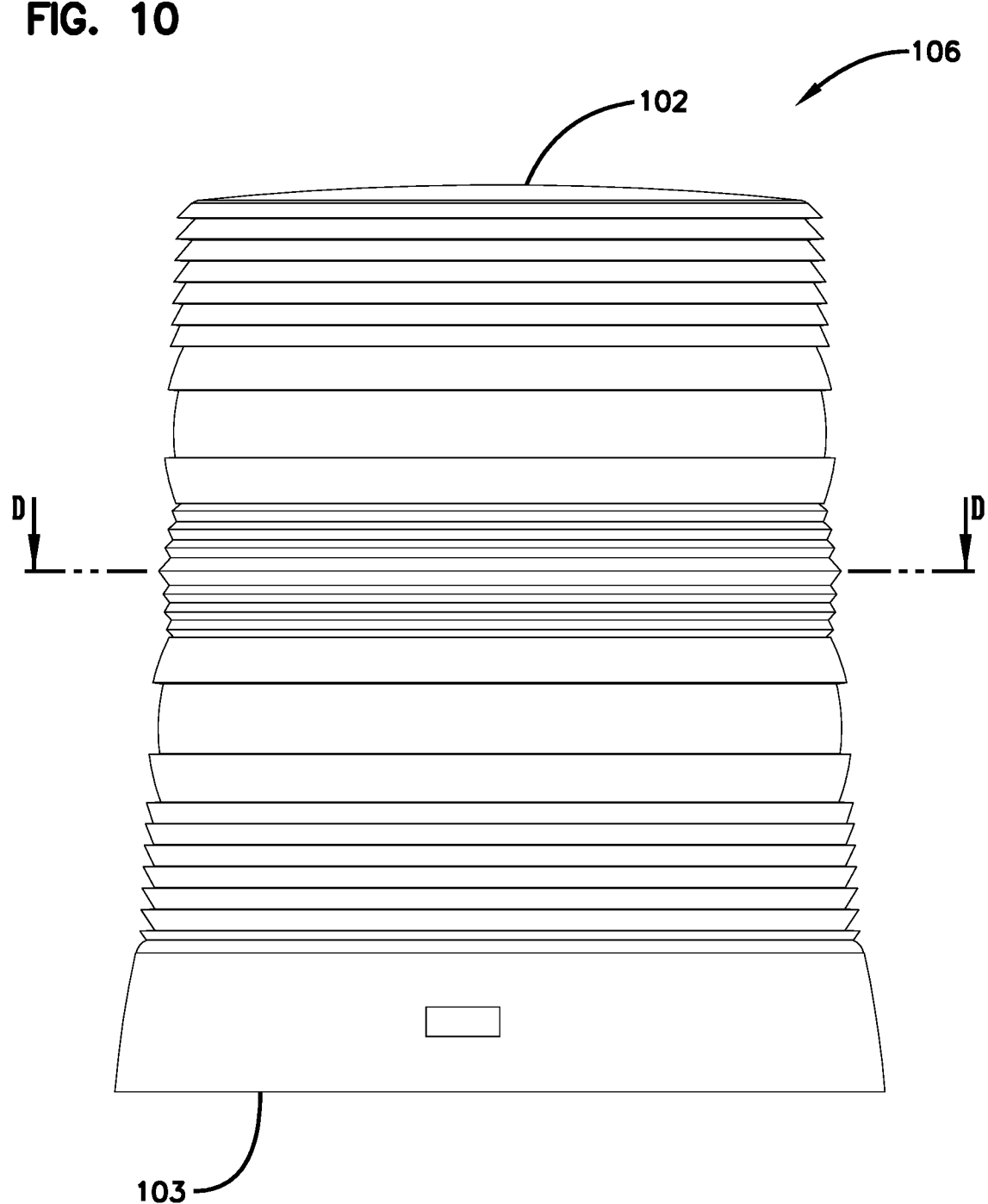
FIG. 10 is a side view of the housing of the beacon of FIG. 1.
Figure 11:
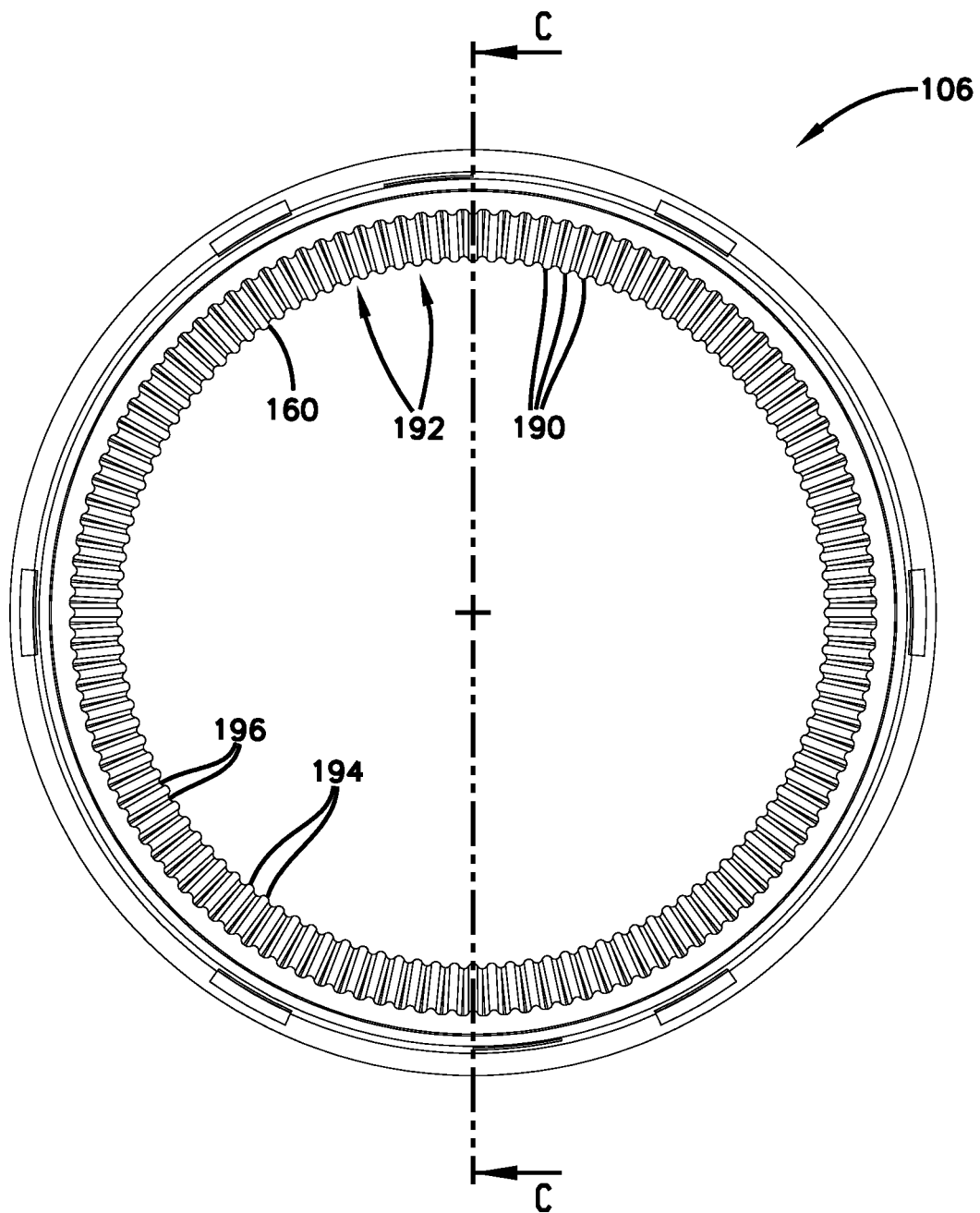
FIG. 11 is a bottom view of the housing of the beacon of FIG. 1.
Figure 12:
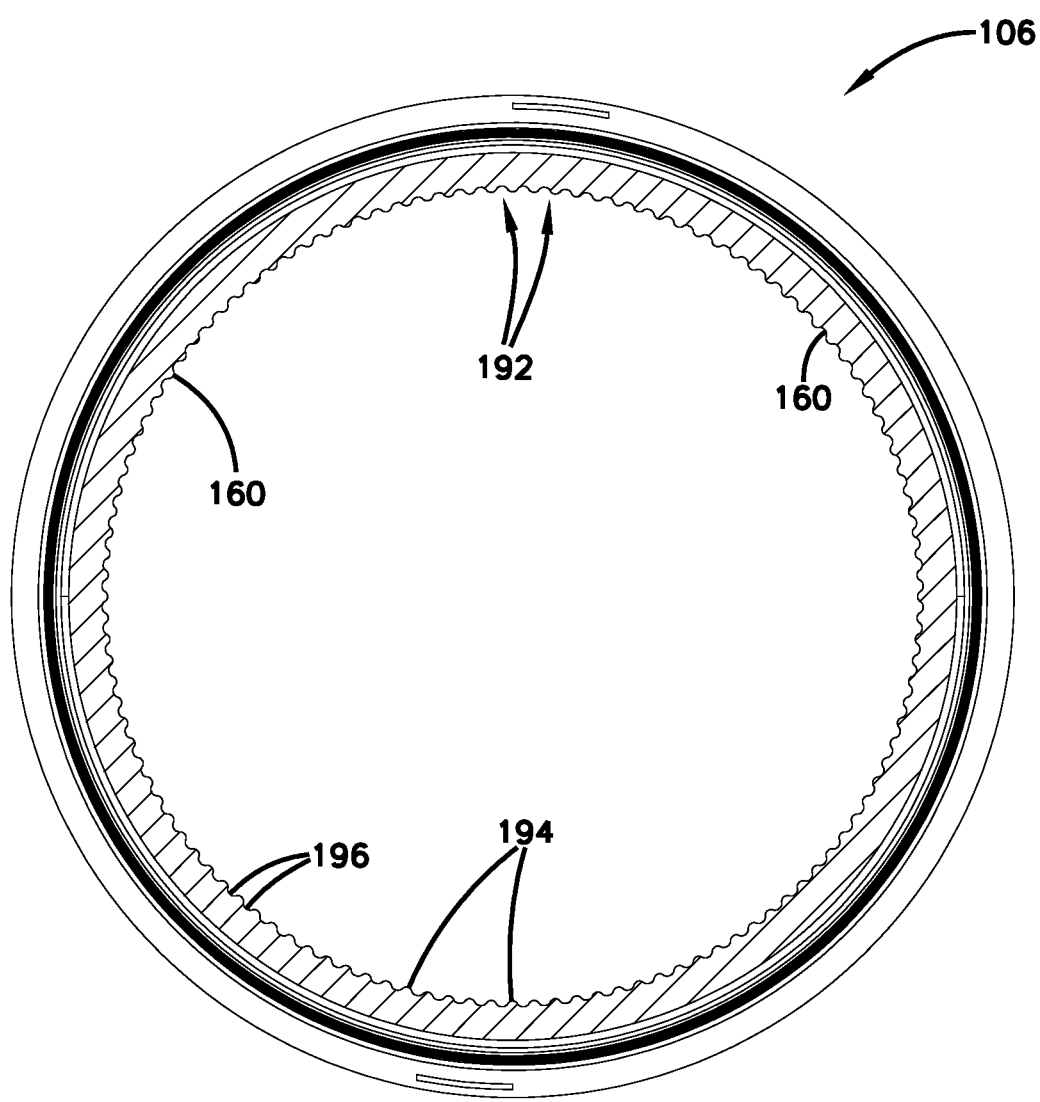
FIG. 12 is a cross-sectional view of the housing of the beacon of FIG. 1, along the line D-D in FIG. 10.
Figure 13:
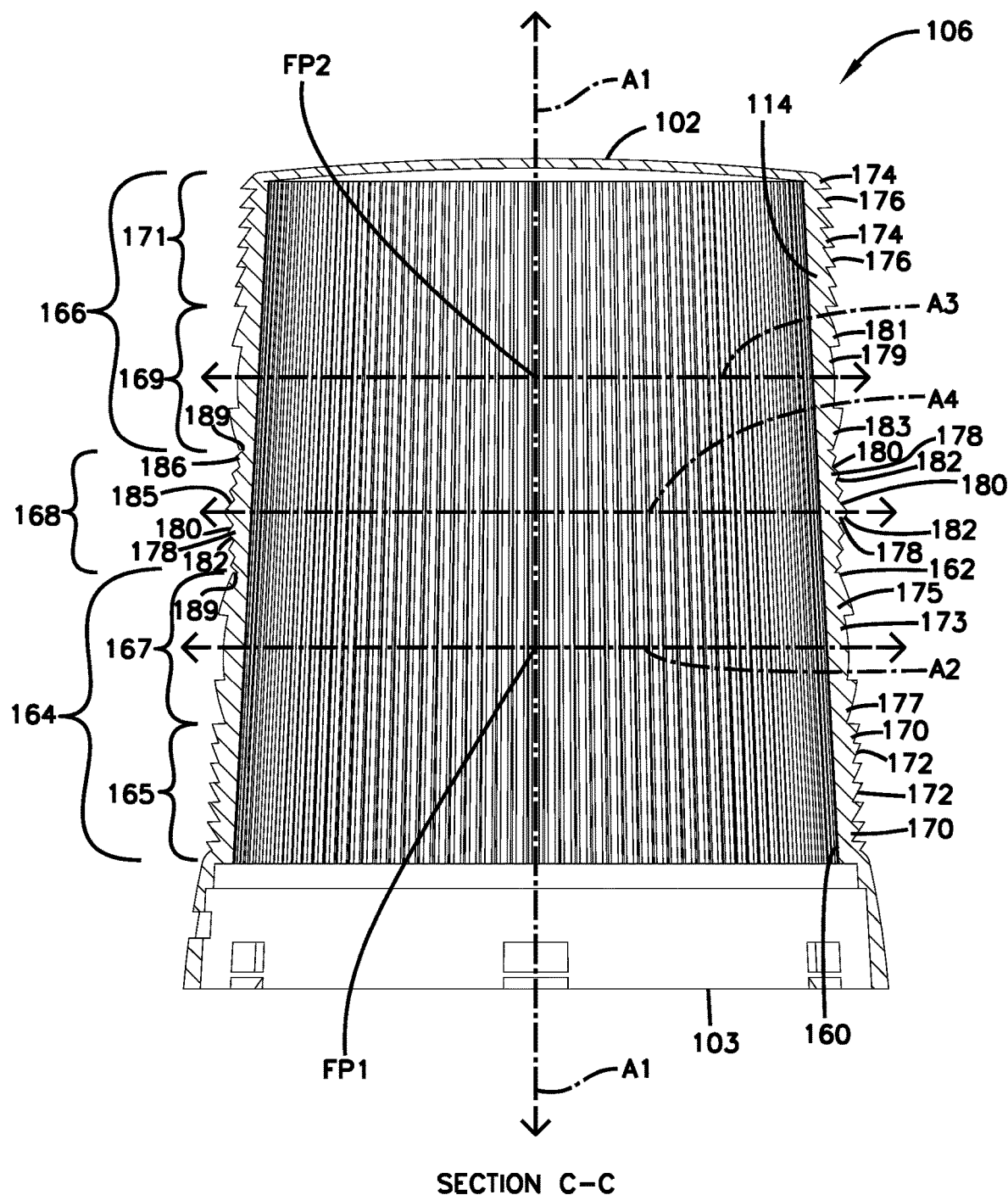
FIG. 13 is a cross-sectional view of the housing of the beacon of FIG. 1, along the line C-C in FIG. 11.

The base 108 is adapted to be securely mounted to another structure, such as a building or a vehicle. Referring to FIG. 9, the beacon 100 is secured to an outer surface, such as the roof 142 of a vehicle 140, such as an emergency vehicle like a police car or fire truck. In some examples, the vehicle 140 and the beacon 100 are part of a system that further includes one or more processors 144, a memory 146 storing computer-readable instructions that are executable by the one or more processors 144, and a controller 148 operatively coupled to the one or more processors 144 and configured to control light emission and light emission patterns produced by the beacon 100.

Referring now to FIGS. 10-13, further optical and other features of the housing 106 of the beacon 100 will now be described. The housing 106 has a closed top 102 and an open bottom 103 that coincides with the bottom 104 of the beacon 100 (FIG. 1).

The side wall 114 of the housing 106 has a curved, radially enclosed inner surface 160 surrounding the central longitudinal axis A1, and an outer surface 162.

The outer surface 162 defines a first collimating region 164, a second collimating region 166, and a third collimating region 168, the third collimating region 168 being above (i.e., closer to the top 104) the first collimating region 164 and below the second collimating region 166.

In some examples, the first and second collimating regions 164 and 166 are configured as portions of Fresnel lenses, and the third collimating region 168 is configured as a superimposition of portions of two Fresnel lenses.

To enhance the optics of the housing 106, the housing 106 optionally includes first and second ring-shaped notches 189 extending at least partially radially inwards towards the central longitudinal axis A1 and positioned at transitions, respectively, between the third collimating region 168 and the first collimating region 164, and between the third collimating region 168 and the second collimating region 166.

The first collimating region 164 has a lower section 165 and an upper section 167. The second collimating region 166 has a lower section 169 and an upper section 171. Each of the first, second, and third collimating regions 164, 166, 168, including the upper and lower sections, 165, 167, 169, and 171 radially extends and surrounds the central longitudinal axis A1. That is, all of the lens elements (described below) of the first, second, and third collimating regions 164, 166, 168 define complete rings in planes that are perpendicular to the central longitudinal axis A1.

The lower section 165 includes lens elements 170 that have surfaces 172 that are optically tuned to the first optical focal point FP1 of the housing 106. As is the nature of Fresnel lenses, the acuteness of angles of the surfaces 172 relative to the axis A2 progressively decreases from the bottom lens element 170 upwards. The upper section 167 includes an outwardly convex central lens element 173 that is optically tuned to the first optical focal point FP1, an outwardly convex upper lens element 175 positioned above the central lens element 173 that is optically tuned to the first optical focal point FP1, and an outwardly convex lower lens element 177 positioned below the central lens element 173 that is optically tuned to the first optical focal point FP1.

The lateral axis A2 that passes through the first optical focal point FP1 coincides with the central lens axis of the central lens element 173.

The upper section 171 of the second collimating region 166 includes lens elements 174 that have surfaces 176 that are optically tuned to the second optical focal point FP2 of the housing 106. The acuteness of the angles of the surfaces 176 relative to the axis A3 progressively decreases from the top lens element 174 downwards. The lower section 169 includes an outwardly convex central lens element 179 that is optically tuned to the second optical focal point FP2, an outwardly convex upper lens element 181 positioned above the central lens element 179 that is optically tuned to the second optical focal point FP2, and an outwardly convex lower lens element 183 positioned below the central element 179 that is optically tuned to the second optical focal point FP2. The lateral axis A3 that passes through the second optical focal point FP2 coincides with the central lens axis of the central lens element 179.

The third collimating region 168 includes lens elements 178. Each of the lens elements 178 includes a first surface or face 180 that is optically tuned to the first optical focal point FP1, and a second surface or face 182 that is optically tuned to the second optical focal FP2.

In order to provide the dual focal point collimation in the third collimating region 168, from the lowest lens element 178 in the third collimating region 168 to the middle of the lens elements 178 (denoted with reference number 185), the lens elements 178 progressively radially thicken (with the thickest lens element 178 of the grouping being the lens element 185), the acuteness of the angles of the surfaces 180 relative to the axis A2 progressively increases, and the acuteness of the angles of the surfaces 182 relative to the axis A3 progressively decreases. Similarly, from the uppermost lens element 178 in the third collimating region 168 to the middle of the lens elements 178 (denoted with reference number 185), the lens elements 178 progressively radially thicken (with the thickest lens element 178 of the grouping being the lens element 185), the acuteness of the angles of the surfaces 180 relative to the axis A2 progressively decreases, and the acuteness of the angles of the surfaces 182 relative to the axis A3 progressively increases.

As noted, the middle lens element 185 of the lens elements 178 in the third collimating region 168 is the thickest of the lens elements 178. In addition, the middle lens element 185 radially protrudes outwardly more than the other lens elements 178. In some examples, the acuteness of the angle of the faces 180 and 182 of the middle lens element 185 relative to the axes A2 and A3, respectively, are identical. In addition, in some examples, the middle lens element 185 is substantially or entirely symmetrical about the lateral axis A4 that bisects the middle lens element 185, the axis A4 being equidistant from the axis A2 and A3 on which lie the focal points FP1 and FP2, respectively.

In the embodiment of the housing 106 shown, each of the lens elements 178 defines a ridge line 186 at a transition between the lens elements surfaces (or faces) 180 and 182.

As shown, collectively, the ridge lines 186 of all of the lens elements 178 define a reference curve that is outwardly convex.

In the embodiment of the housing 106 shown, the total number (seven) of lens elements 178 equals the total number (seven) of lens elements 170 and 174. It should be appreciated that more or fewer lens elements can be provided in the various regions and sections.

In addition, the longitudinal length of the lower section 165 equals the longitudinal length of the upper section 171, and the longitudinal length of the third collimating region 168. In addition, the longitudinal length of the upper section 167 equals the longitudinal length of the lower section 169. In some examples, a longitudinal center of the third region is at the same height as a longitudinal midpoint between the first and second optical focal points.

Figure 6:
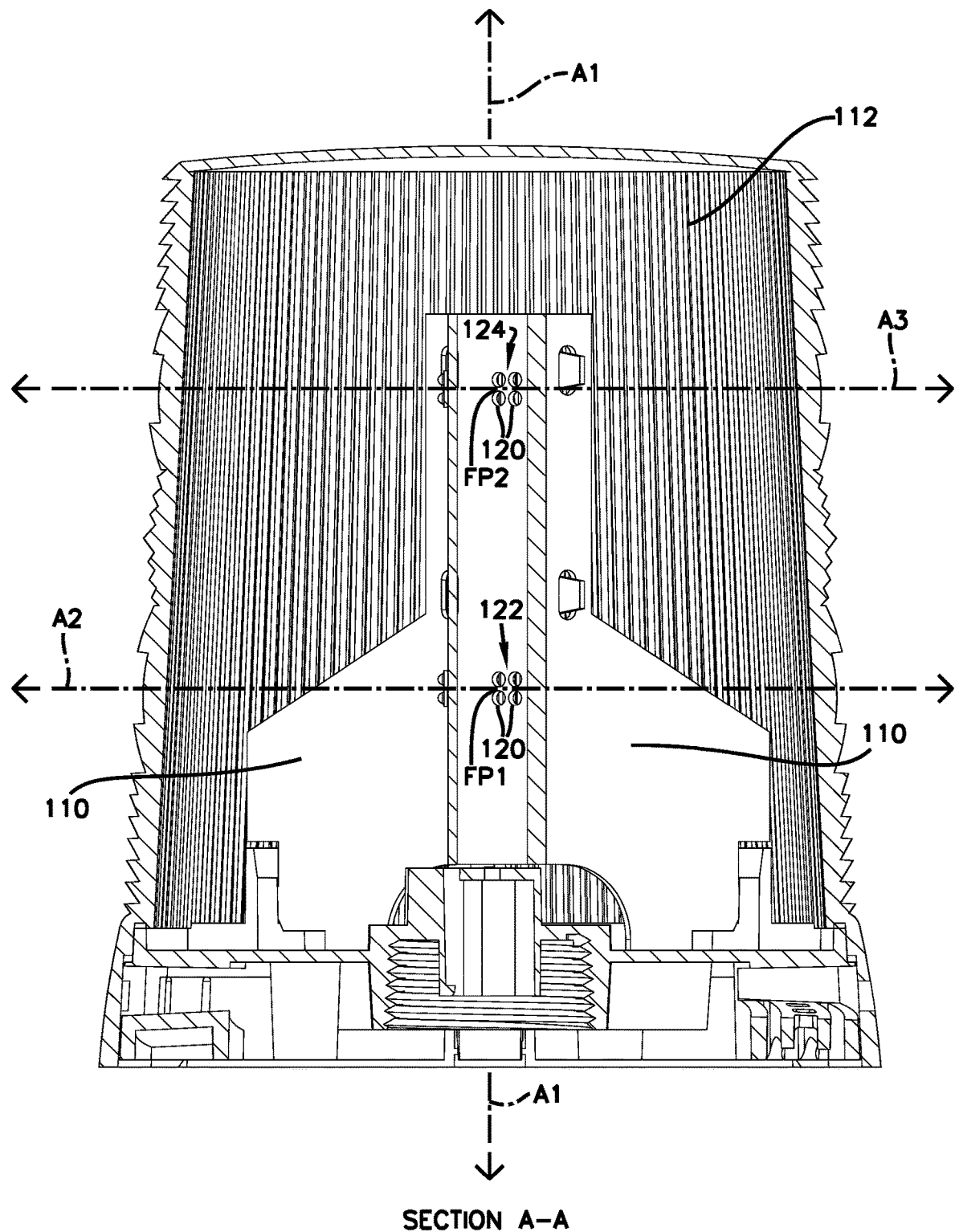
FIG. 6 is a cross-sectional view of the light beacon of FIG. 1 along the line A-A in FIG. 5.
Figure 7:
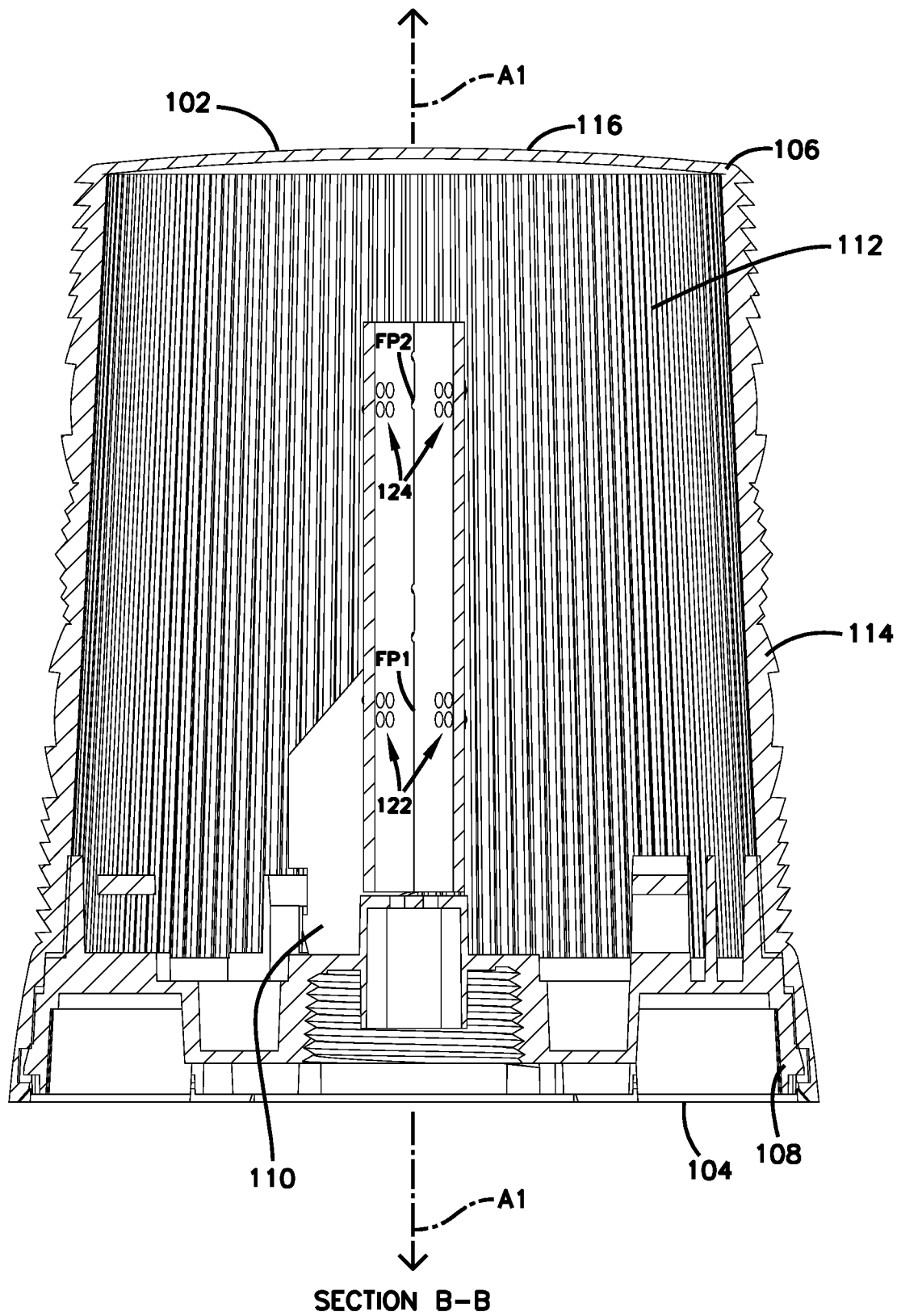
FIG. 7 is a cross-sectional view of the light beacon of FIG. 1 along the line B-B in FIG. 5.

Optionally, as shown in the depicted embodiment of the housing 106, the inner surface 160 includes a plurality of light spreaders 190 for providing radial spreading of light through the wall 114 from the light emitters 120 (FIG. 6). In this embodiment, the light spreaders 190 are undulations 192 of the inner surface 160 and extend predominantly longitudinally, the undulations 192 including alternating radial peaks 194 and radial valleys 196. The undulations 192 are regularly radially spaced apart from one another and entirely surround the central longitudinal axis A1 (into the page in FIGS. 11-12) of the housing 106.

The peaks 194 define a reference surface for the inner surface 160. In this example, the reference surface is frusto-conical. In other examples, the reference surface can be, e.g., cylindrical, or another shape.

The light spreaders 190 can improve performance of the beacon 100 (e.g., improving visibility of the beacon from all directions), for example, when the light emitters 120 (FIG. 6) are LEDs. LEDs generally emit light in a cone with a spread of 120°. The light spreaders 190 act as prisms that spread the light emitted by the LEDs towards a direction of the LED's lowest performance.

A light beacon according to a first embodiment of the present disclosure comprises: a housing adapted to transmit light, the housing having a curved, radially enclosed inner surface defined by a central longitudinal axis extending from a first end to a second end of the housing, and an outer surface, the outer surface defining at least first, second, and third optical collimating regions, the third collimating region being above the first collimating region and below the second collimating region, the first collimating region including at least one lens element optically tuned to a first optical focal point of the housing, the second collimating region including at least one lens element optically tuned to a second optical focal point of the housing, and the third collimating region including at least one lens element optically tuned to both the first and the second optical focal points of the housing, the first and second optical focal points being located along the central longitudinal axis and spaced apart from each other.

According to a second embodiment, there is provided the first embodiment, wherein the inner surface of the housing includes a plurality of light spreaders.

According to a third embodiment, there is provided the second embodiment, wherein the plurality of light spreaders comprise at least substantially longitudinally extending undulations of the inner surface, the undulations including alternating radial peaks and radial valleys.

According to a fourth embodiment, there is provided the third embodiment, wherein the undulations are regularly radially spaced apart from one another and entirely surround the central longitudinal axis of the beacon.

According to a fifth embodiment, there is provided the first embodiment, wherein a longitudinal center of the third region is at the same height as a longitudinal midpoint between the first and second optical focal points.

According to a sixth embodiment, there is provided the first embodiment, wherein the inner surface is a cylindrical surface.

According to a seventh embodiment, there is provided the first embodiment, wherein the inner surface is a frusto-conical surface.

According to an eight embodiment, there is provided the first embodiment, wherein the housing has a closed top at the second end and an open bottom at the first end.

According to a ninth embodiment, there is provided the first embodiment, wherein the housing is mounted to a base.

According to a tenth embodiment, there is provided a light beacon system, comprising: a vehicle or a building; a light beacon according to any of the first through ninth embodiments, the light beacon being mounted to a surface of the vehicle or within the building.

According to an eleventh embodiment, there is provided the tenth embodiment, further comprising a controller for controlling a light emission by the light beacon.

According to a twelfth embodiment, there is provided any of the tenth or eleventh embodiments, further comprising one or more processors and a memory storing computer-readable instructions that are executable by the one or processors to generate signals for controlling light emission by the light beacon.

The description and illustration of one or more embodiments provided in this application are not intended to limit or restrict the scope of the inventions as claimed in any way. The embodiments, examples, and details provided in this application are considered sufficient to convey possession and enable others to make and use the best mode of claimed inventions. The claimed inventions should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed inventions and the general inventive concept embodied in this application that do not depart from the broader scope.

What is claimed is:

1. A light beacon, comprising:
a housing adapted to transmit light, the housing having a curved, radially enclosed inner surface defined by a central longitudinal axis extending from a first end to a second end of the housing, and an outer surface, the outer surface defining at least first, second, and third optical collimating regions, the third collimating region being above the first collimating region and below the second collimating region, the first collimating region including at least one lens element optically tuned to a first optical focal point of the housing, the second collimating region including at least one lens element optically tuned to a second optical focal point of the housing, and the third collimating region including a lens element optically tuned to both the first and the second optical focal points of the housing, the first and second optical focal points being located along the central longitudinal axis and spaced apart from each other,
wherein the lens element of the third collimating region includes a first outward face tuned to the first optical focal point and a second outward face tuned to the second optical focal point; and
wherein there is a first ridge line at a transition between the first outward face and the second outward face.

2. The light beacon of claim 1, wherein the first focal point is located below the second focal point along the central longitudinal axis.

3. The light beacon of claim 1, wherein the outer surface of the housing defines Fresnel lens elements in at least a portion of the first collimating region and at least a portion of the second collimating region.

4. The light beacon of claim 1,
wherein the outer surface of the housing is configured such that the first collimating region includes a first upper section and a first lower section, the first upper section including an outwardly convex first central lens element, an outwardly convex first upper lens element positioned above the first central lens element, and an outwardly convex first lower lens element positioned below the first central element, the second collimating region includes a second upper section and a second lower section, the second lower section including an outwardly convex second central lens element, an outwardly convex second upper lens element positioned above the second central lens element, and an outwardly convex second lower lens element positioned below the second central lens element,
wherein the lens elements of the first upper section are tuned to the first optical focal point, and
wherein the lens elements of the second upper section are tuned to the second optical focal point.

5. The light beacon of claim 4, wherein the outer surface of the housing is configured such that the first lower section includes a plurality of lower lens elements that are tuned to the first focal point, and the second upper section includes a plurality of upper lens elements that are tuned to the second focal point.

6. The light beacon of claim 5, wherein the lens element of the third collimating region is one of a plurality of third lens elements, each of the plurality of third lens elements including a first outward face tuned to the first optical focal point and a second outward face tuned to the second optical focal point.

7. The light beacon of claim 6, wherein the third lens elements include a middle lens element that protrudes outwardly more than the others of the third lens elements.

8. The light beacon of claim 7, wherein the first ridge line is one of a plurality of ridge lines, each of the plurality of ridge lines being defined at a transition between the first and second outward faces of one of the third lens elements, wherein the plurality of ridge lines define a reference curve that is outwardly convex.

9. The light beacon of claim 8, wherein a total number of the third lens elements equals a total number of each of a total number of the upper lens elements and a total number of a lower lens elements.

10. The light beacon of claim 4, wherein a longitudinal length of the first lower section equals a longitudinal length of the second upper section.

11. The light beacon of claim 4, wherein a longitudinal length of the first lower section equals a longitudinal length of the second upper section and a longitudinal length of the third collimating region.

12. The light beacon of claim 4, wherein a longitudinal length of the first upper section equals a longitudinal length of the second lower section.

13. The light beacon of claim 6, wherein all of the lens elements of the first, second, and third collimating regions define complete rings in planes perpendicular to the longitudinal axis.

14. The light beacon of claim 4, wherein a central lens axis of the first central lens element extends through the first focal point, and a central lens axis of the second central lens element extends through the second focal point.

15. The light beacon of claim 1, wherein a light emitter is positioned within the housing at the same height as at least one of the first optical focal point and the second optical focal point.

16. The light beacon of claim 1, wherein a light emitter is positioned within the housing at the same height as each of the first and second optical focal points.

17. The light beacon of claim 16, wherein the light emitters are positioned at the first and second optical focal points.

18. The light beacon of claim 17, wherein the light emitters are adapted to emit light towards the inner surface of the housing.

19. The light beacon of claim 1, wherein the housing includes a first ring-shaped notch extending at least partially radially inwards towards the central longitudinal axis and positioned between the third collimating region and the first collimating region, and a second ring-shaped notch extending at least partially radially inwards towards the central longitudinal axis and positioned between the third collimating region and the second collimating region.

20. A light beacon, comprising:
a housing adapted to transmit light, the housing having a curved, radially enclosed inner surface defined by a central longitudinal axis extending from a first end to a second end of the housing, and an outer surface, the outer surface defining at least first, second, and third optical collimating regions, the third collimating region being above the first collimating region and below the second collimating region, the first collimating region including at least one lens element optically tuned to a first optical focal point of the housing, the second collimating region including at least one lens element optically tuned to a second optical focal point of the housing, and the third collimating region including at least one lens element optically tuned to both the first and the second optical focal points of the housing, the first and second optical focal points being located along the central longitudinal axis and spaced apart from each other,
wherein the housing includes a ring-shaped notch extending at least partially radially inwards towards the central longitudinal axis and positioned between the third collimating region and either the first or the second collimating region.

* * * * *